US012559668B2

(12) United States Patent
Daeffler et al.

(10) Patent No.: US 12,559,668 B2
(45) Date of Patent: Feb. 24, 2026

(54) EMULSIONS CONTAINING WATER-SOLUBLE ACID RETARDING AGENTS AND METHODS OF MAKING AND USING

(71) Applicant: Schlumberger Technology Corporation, Sugar Land, TX (US)

(72) Inventors: Christopher Daeffler, Houston, TX (US); Mohan Kanaka Raju Panga, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/886,189

(22) Filed: Sep. 16, 2024

(65) Prior Publication Data

US 2025/0059434 A1 Feb. 20, 2025

Related U.S. Application Data

(60) Continuation of application No. 18/305,765, filed on Apr. 24, 2023, now Pat. No. 12,091,610, which is a (Continued)

(51) Int. Cl.

| | |
|---|---|
| ***C09K 8/72*** | (2006.01) |
| ***C09K 8/60*** | (2006.01) |
| ***C09K 8/66*** | (2006.01) |
| ***C09K 8/70*** | (2006.01) |
| ***C09K 8/74*** | (2006.01) |
| ***E21B 41/02*** | (2006.01) |
| ***E21B 43/27*** | (2006.01) |

(52) U.S. Cl.
CPC ................ *C09K 8/602* (2013.01); *C09K 8/66* (2013.01); *C09K 8/703* (2013.01); *C09K 8/74* (2013.01); *E21B 41/02* (2013.01); *E21B 43/27* (2020.05)

(58) Field of Classification Search
CPC .......... C09K 8/602; C09K 8/66; C09K 8/703; C09K 8/74; E21B 41/02; E21B 43/27
USPC .......................................................... 166/307
See application file for complete search history.

(56) References Cited

U.S. PATENT DOCUMENTS 2,485,529 A 10/1949 Cardwell
3,681,240 A 8/1972 Fast
(Continued)

FOREIGN PATENT DOCUMENTS

CN 105670599 A 6/2016
CN 110564398 A 12/2019
(Continued)

OTHER PUBLICATIONS

Al-Ghamdi, A. H.; et al., "Acid Diversion by Use of Viscoelastic Surfactants: The Effects of Flow Rate and Initial Permeability Contrast." SPE 142564, Dec. 2014, SPE Journal, pp. 1203-1216.
(Continued)

*Primary Examiner* — Angela M DiTrani Leff
(74) *Attorney, Agent, or Firm* — Jeffrey D. Frantz

(57) ABSTRACT

A multi-phase aqueous composition includes a surfactant; a first phase comprising water, an acid, and a water-soluble acid retarding agent; and a second phase selected from the group consisting of an immiscible organic phase, a gas, and combinations thereof. Further described are methods of making and using such compositions.

11 Claims, 4 Drawing Sheets

Related U.S. Application Data continuation of application No. 17/403,506, filed on Aug. 16, 2021, now abandoned, which is a division of application No. 15/757,423, filed as application No. PCT/US2016/049335 on Aug. 30, 2016, now Pat. No. 11,091,689.

(60) Provisional application No. 62/213,986, filed on Sep. 3, 2015.

(56) References Cited

U.S. PATENT DOCUMENTS 3,799,366 A * 3/1974 Omelchuk ............. B30B 7/023 414/277
3,826,312 A 7/1974 Richardson
3,920,566 A 11/1975 Richardson
3,934,651 A * 1/1976 Nierode ................. E21B 43/27 166/308.1
4,140,640 A * 2/1979 Scherubel ................ C09K 8/72 507/250
4,368,136 A 1/1983 Murphey
4,420,414 A 12/1983 Valone
4,466,893 A 8/1984 Dill
4,650,000 A * 3/1987 Andreasson ............. C09K 8/74 507/266
4,702,848 A 10/1987 Payne
4,703,797 A 11/1987 Djabbarah
4,730,676 A 3/1988 Luers
4,747,975 A 5/1988 Ritter
4,807,703 A 2/1989 Jennings, Jr.
5,120,471 A 6/1992 Jasinski
5,220,960 A 6/1993 Totten
5,294,353 A * 3/1994 Dill .......................... C09K 8/82 507/269
5,310,002 A 5/1994 Blauch
5,327,973 A 7/1994 Jennings, Jr.
5,547,022 A 8/1996 Juprasert
5,773,024 A 6/1998 Unger
5,990,051 A 11/1999 Ischy
6,117,364 A 9/2000 Vorderbruggen
6,196,318 B1 3/2001 Gong
6,436,880 B1 8/2002 Frenier
7,148,184 B2 12/2006 Francini
7,237,608 B2 7/2007 Fu
7,350,572 B2 4/2008 Fredd
7,603,261 B2 10/2009 Tardy
7,615,516 B2 11/2009 Yang
7,635,028 B2 12/2009 Li
7,696,393 B2 4/2010 Rivers
7,774,183 B2 8/2010 Tardy
7,833,947 B1 11/2010 Kubala
7,915,205 B2 3/2011 Smith
8,163,102 B1 4/2012 MacDonald
8,551,926 B2 10/2013 Huang
8,580,047 B1 11/2013 MacDonald
8,940,106 B1 1/2015 MacDonald
9,034,806 B2 5/2015 Gurmen
9,085,975 B2 7/2015 Abad
9,376,611 B2 6/2016 Berry
9,573,808 B2 2/2017 Jiang
9,796,490 B2 10/2017 Jiang
9,809,716 B2 11/2017 Beuterbaugh
9,920,606 B2 3/2018 Jiang
10,035,944 B2 7/2018 Purdy
10,131,831 B2 11/2018 Rimassa
10,378,325 B2 8/2019 Panga
10,703,957 B2 7/2020 Al-Yami
10,767,474 B2 9/2020 Feng
10,787,606 B2 9/2020 Weider
10,954,432 B2 3/2021 Panga
10,982,133 B2 4/2021 Purdy
11,091,689 B2 8/2021 Daeffler
11,098,241 B2 8/2021 Purdy
11,168,244 B2 11/2021 Phan
2002/0023752 A1 2/2002 Qu
2002/0147114 A1 10/2002 Dobson
2004/0009880 A1 1/2004 Fu
2004/0129418 A1 7/2004 Jee
2005/0124500 A1 6/2005 Chen
2006/0042797 A1 3/2006 Fredd
2006/0102349 A1 5/2006 Brady
2006/0180308 A1 8/2006 Welton
2007/0235189 A1* 10/2007 Milne ...................... C09K 8/74 507/923
2007/0293404 A1 12/2007 Hutchins
2008/0139412 A1 6/2008 Fuller
2008/0200353 A1 8/2008 Dahayanake
2008/0269081 A1 10/2008 Lin
2008/0289828 A1* 11/2008 Hutchins .................. C09K 8/88 166/308.3
2008/0314594 A1 12/2008 Still
2009/0247431 A1 10/2009 Gupta
2010/0010106 A1 1/2010 Crews
2010/0022418 A1 1/2010 Milne
2010/0224365 A1 9/2010 Abad
2010/0243242 A1 9/2010 Boney
2010/0248996 A1 9/2010 Sawdon
2010/0331223 A1 12/2010 Li
2011/0036583 A1 2/2011 Willberg
2012/0238479 A1 9/2012 Choudhary
2013/0025870 A1 1/2013 Berry
2013/0032345 A1 2/2013 Freese
2013/0261032 A1 10/2013 Ladva
2013/0327531 A1 12/2013 Dahayanake
2014/0116708 A1* 5/2014 Wadekar ................ E21B 43/25 507/242
2014/0166291 A1 6/2014 Friesen
2014/0166589 A1 6/2014 Hicks
2014/0171345 A1 6/2014 Steiner
2014/0174742 A1 6/2014 Mirakyan
2014/0212006 A1 7/2014 Zhao
2014/0246198 A1 9/2014 Pandya
2014/0256604 A1 9/2014 Wadekar
2014/0329725 A1* 11/2014 Karale ..................... C09K 8/72 507/225
2014/0367100 A1* 12/2014 Oliveira ................... C09K 8/80 166/280.1
2015/0034315 A1 2/2015 Jiang
2015/0034318 A1 2/2015 Jiang
2015/0080271 A1 3/2015 De Wolf
2015/0114647 A1 4/2015 Jiang
2015/0200147 A1 7/2015 Lien
2015/0240147 A1 8/2015 Jiang
2015/0260021 A1 9/2015 Reyes
2015/0322762 A1 11/2015 Varadaraj
2015/0344771 A1* 12/2015 Jiang ....................... E21B 43/25 166/305.1
2016/0024370 A1 1/2016 Ba Geri
2016/0025895 A1 1/2016 Ziauddin
2016/0146964 A1 5/2016 Badri
2016/0237340 A1 8/2016 Pandya
2016/0298024 A1 10/2016 Panga
2017/0037304 A1 2/2017 Rimassa
2017/0267918 A1 9/2017 Daeffler
2018/0244981 A1 8/2018 Panga
2018/0244982 A1 8/2018 Yakovlev
2018/0273834 A1 9/2018 Qiu
2018/0282613 A1 10/2018 Blackbourn
2019/0010385 A1 1/2019 Sayed
2019/0194528 A1 6/2019 Purdy
2019/0292440 A1 9/2019 Purdy
2020/0224085 A1 7/2020 Purdy
2020/0224086 A1 7/2020 Purdy
2020/0270505 A1 8/2020 Reddy
2020/0318009 A1 10/2020 Purdy
2020/0399530 A1 12/2020 Zakaria
2021/0002543 A1 1/2021 Jin
2021/0130680 A1 5/2021 Purdy
2021/0189226 A1 6/2021 Purdy
2021/0198561 A1 7/2021 Purdy
2021/0253936 A1 8/2021 Purdy
2021/0277302 A1 9/2021 Qiu
2021/0380872 A1 12/2021 Daeffler

(56) References Cited

U.S. PATENT DOCUMENTS

| | | | |
|---|---|---|---|
| 2023/0257645 A1 | 8/2023 | Daeffler |
| 2023/0279284 A1 | 9/2023 | Qiu |
| 2024/0309266 A1 | 9/2024 | Fernandez Del Valle |
| 2025/0059434 A1 | 2/2025 | Daeffler |

FOREIGN PATENT DOCUMENTS

| | | | |
|---|---|---|---|
| EP | 2524017 | A1 | 11/2012 |
| KR | 1020200108408 | A | 9/2020 |
| RU | 2247833 | C1 | 3/2005 |
| WO | 2000019062 | A1 | 4/2000 |
| WO | 2004005672 | A1 | 1/2004 |
| WO | 2006136262 | A1 | 12/2006 |
| WO | 2009077958 | A1 | 6/2009 |
| WO | 2011148282 | A1 | 12/2011 |
| WO | 2014193546 | A1 | 12/2014 |
| WO | 2015020688 | A1 | 2/2015 |
| WO | 2015154977 | A1 | 10/2015 |
| WO | 2016105996 | A1 | 6/2016 |
| WO | 2016164056 | A1 | 10/2016 |
| WO | 2017040434 | A1 | 3/2017 |
| WO | 2017040553 | A1 | 3/2017 |
| WO | 2017040562 | A1 | 3/2017 |
| WO | 2018018129 | A1 | 2/2018 |
| WO | 2019245983 | A1 | 12/2019 |
| WO | 2021126303 | A1 | 6/2021 |
| WO | 2023283480 | A1 | 1/2023 |
| WO | 2023287746 | A1 | 1/2023 |
| WO | 2023049360 | A1 | 3/2023 |
| WO | 2023102001 | A1 | 6/2023 |
| WO | 2023183462 | A1 | 9/2023 |
| WO | 2023183465 | A1 | 9/2023 |

OTHER PUBLICATIONS

Baker, B. D. et al., "Stimulation Practices Using Alcoholic Acidizing and Fracturing Fluids for Gas Reservoirs", SPE-4836-MS presented at the SPE European Spring Meeting, 1974, 7 pages.

Bonn, M. et al.,"Suppression of Proton Mobility by Hydrophobic Hydration" J. Am. Chem. Soc. 2009, 131, 17070-17071.

Buijse, M. A, "Understanding wormholing mechanisms can improve acid treatments in carbonate formations", SPE Production Facilities, vol. 15, No. 3, 2000, pp. 168-175.

Callahan, K. M. et al., "Solvation of Magnesium Dication: Molecular Dynamics Simulation and Vibrational Spectroscopic Study of Magnesium Chloride in Aqueous Solution", J. Phys. Chem. A. 2010, 114, pp. 5141-5148.

Chemicalland21, "Lauryl alcohol ethoxlates", http://www.chamicalland21.com/specialtychem/perchem/lauryl%20alcohol%20ethoxylate.htm, Jan. 17, 2015, 5 pages.

Crowe, C.W.; et al., "Investigation of Retarded Acids Provides Better Understanding of Their Effectiveness and Potential Benefits", SPE 18222, SPE Production Engineering, May 1990, pp. 166-170.

Edward et al., "The Dielectric Increments of Amino Acids", J. Am. Chem. Soc. 1974, 96, pp. 902-906.

Fredd, C. N. et al., "Influence of Transport and Reaction on Wormhole Formation in Carbonate Porous Media", AlChE Journal, 1998, 44(9), pp. 1933-1949.

Ghommem, M. et al., "Carbonate Acidizing: Modeling, Analysis, and Characterization of Wormhole Formation and Propagation", Journal of Petroleum Science and Engineering, 2015, 131, pp. 18-33.

Liu, M. et al., "Wormhole Propagation Behavior Under Reservoir Condition in Carbonate Acidizing", Transport in porous Media, 2013, 96(1), pp. 203-220.

Lungwitz, B. et al., "Diversion and Cleanup Studies of Viscoelastic Surfactant-Based Self-Diverting Acid", SPE 86504, SPE International Symposium and Exhibition on Formation Damage Control, Feb. 18-20, 2004, 10 pages.

Mou, J. et al., "Diversion Conditions for Viscoelastic-Surfactant-Based Self-Diversion Acid in Carbonate Acidizing" SPE 173898, May 2015, SPE Production Operations, pp. 121-129.

Panga, M. K. R et al., "Two-Scale Continuum Model for Simulation of Wormholes in Carbonate Acidization", AICHE J. 2005, 51, pp. 3231-3248.

Petrov, et al., "An Integrated approach to the treatment of the bottom-hole zone of the formation as a method for intensification of production", Scientific and technical journal Georesources, No. 1,(33), 2010, pp. 7-10, 8 pages with machine translation.

Scherubel, G. A. et al., "Foamed Acid, A New Concept in Fracture Acidizing" paper SPE 7568, presented at the Annual Fall Technical Conference and Exhibition, Houston, TX, USA, Oct. 1978, 8 pages.

Tardy, P. M. J. et al., "An Experimentally Validated Wormhole Model for Self-Diverting and Conventional Acids in Carbonate Rocks Under Radial Flow Conditions" paper SPE 107854, presented at the European Formation Damage Conference held in Scheveningen, The Netherlands, May 30-Jun. 1, 2007; 17 pages.

Travalani-Louvisse, A.M. et al., "The use of ethanol in oil well stimulation fluids", Journal of Petroleum Science and Engineering, 1990, 4(3), pp. 257-272.

Wyman, J. "Dielectric Constant: Ethanol-Diethyl Ether and Urea-Water Solutions between 0 and 50", J. Am. Chem. Soc. 1933, 55, pp. 4116-4121.

Xu, J. et al., "On the Origin of Proton Mobility Suppression in Aqueous Solutions in Amphiphiles", J. Phys. Chem. B. 2013, 117, 15426-15435.

Examination Report issued in GCC Patent Appl. No. GC 2016-31138 on Jul. 17, 2018; 4 pages.

International Search Report and Written Opinion issued in the PCT Aplication No. PCT/US2016/025967 dated Jul. 14, 2016, 9 pages.

International Search Report and Written Opinion issued in International Patent Appl. No. PCT/US2016/049335 on Nov. 17, 2016; 9 pages.

PCT International Preliminary Report on Patentability; Application No. PCT/US2016/049335; Dated Mar. 15, 2018; 8 pages.

Eurasian Office Action issued in Eurasian Patent Application No. 201890638 on Oct. 2, 2018; 6 pages (with English Translation).

Examination Report issued in related GC Application GC 2016-39640 on Jul. 8, 2021; 5 pages.

Examination Report issued in the related GC Application GC/2016/31967 dated Nov. 20, 2018 (4 pages).

Third Examination Report issued in the related GC Application GC/2016/31967 dated Feb. 17, 2021, 4 pages.

Eurasian Office Action issued in Eurasian Patent Application No. 201890637 Mar. 27, 2019; 12 pages (with English Translation).

Examination Report issued in the related GC Application GC/2016/31966 dated Nov. 26, 2018 (4 pages).

International Search Report and Written Opinion issued in International Patent Application No. PCT/US2016/049538 on Nov. 10, 2016; 10 pages.

International Preliminary Report on Patentability issued in International Patent Application No. PCT/US2018/024439 on Oct. 10, 2019; 10 pages.

Extended European Search Report issued in European Patent Appl. No. 18776307.3 on Dec. 10, 2020; 9 pages.

Exam Report Issued in Qatar Patent Application No. QA/201909/000510 dated Oct. 29, 2023, 5 pages with English translation.

Office Action issued in Kazakhstan Patent Appl. No. 2019/0788.1 on Nov. 2, 2020; 15 pages (with English translation).

International Search Report and Written Opinion issued in International Patent Appl. No. PCT/US2018/024439 on Jul. 12, 2018; 14 pages.

Substantive Exam issued in Saudi Arabian Patent Application No. 519410203 dated May 24, 2022, 10 pages with English translation.

Office Action issued in U.S. Appl. No. 18/577,787 dated Nov. 8, 2024, 39 pages.

International Search Report and Writtin Opinion issued in the PCT Application No. PCT/US2022/036641 dated Nov. 4, 2022, 13 pages.

Office Action issued in U.S. Appl. No. 18/689,334 dated Aug. 30, 2024, 10 pages.

(56) References Cited

OTHER PUBLICATIONS

Office Action issued in U.S. Appl. No. 18/689,334 dated Jul. 25, 2024, 24 pages.
Search Report and Written Opinion of International Patent Application No. PCT/US2022/044553 dated Jan. 18, 2023, 6 pages.
Office Action issued in U.S. Appl. No. 18/691,989 dated Oct. 11, 2024, 22 pages.
Search Report and Written Opinion of International Patent Application No. PCT/US2022/051322 dated Apr. 14, 2023, 7 pages.
Search Report and Written Opinion of International Patent Application No. PCT/US2023/016026 dated Jul. 7, 2023, 8 pages.
Search Report and Written Opinion of International Patent Application No. PCT/US2023/016032 dated Jul. 18, 2023, 9 pages.

* cited by examiner

EMULSIONS CONTAINING WATER-SOLUBLE ACID RETARDING AGENTS AND METHODS OF MAKING AND USING

CROSS-REFERENCE TO RELATED APPLICATIONS

This application is a continuation of U.S. Non-Provisional application Ser. No. 17/403,506 filed Aug. 16, 2021, which is a divisional of U.S. Non-Provisional application Ser. No. 15/757,423 filed Mar. 5, 2018, now U.S. Pat. No. 11,091,689, which is a National Stage Entry of International Application No. PCT/US2016/049335 filed Aug. 30, 2016, which claims the benefit of U.S. Provisional Application Ser. No. 62/213,986 filed Sep. 3, 2015, the disclosures of which are incorporated herein by reference.

BACKGROUND

Field

The disclosure relates to emulsions and/or foams containing water-soluble acid retarding agents, and to methods of making and using. Such emulsions and/or foams including acid-in-oil (A/O) or oil-in-acid (O/A) emulsions.

Description of the Related Art

This section provides background information to facilitate a better understanding of the various aspects of the disclosure. It should be understood that the statements in this section of this document are to be read in this light, and not as admissions of prior art.

Hydrocarbon fluids such as oil and natural gas are obtained from a subterranean geologic formation, commonly referred to as a reservoir, by drilling a well that penetrates the hydrocarbon-bearing formation. Once a wellbore is drilled, various forms of well completion components may be installed in order to control and enhance the efficiency of producing the various fluids from the reservoir. Well treatment methods often are used to increase hydrocarbon production by using a chemical composition, such as a treatment fluid.

Stimulation operations may be performed to facilitate production of fluids from subsurface formations by increasing the net permeability of a reservoir. There are two main stimulation techniques: matrix stimulation and fracturing. Matrix stimulation is accomplished, typically in sandstone rich formations, by injecting a fluid (e.g., acid or solvent) to dissolve and/or disperse materials that impair well production. Specifically, matrix stimulation may be performed (1) by injecting chemicals into the wellbore to react with and dissolve the damage and (2) by injecting chemicals through the wellbore and into the formation to react with and dissolve small portions of the formation to create alternative flowpaths for the hydrocarbon (e.g., instead of removing the damage, redirecting the migrating oil around the damage). Fracturing involves injecting chemicals through the wellbore and into the formation at pressures sufficient to actually fracture the formation, thereby creating a large flow channel through which hydrocarbon can more readily move from the formation and into the wellbore.

In carbonate formations, the goal of matrix stimulation is to create new, unimpaired flow channels from the formation to the wellbore. Matrix stimulation, typically called matrix acidizing when the stimulation fluid is an acid, generally is used to treat the near-wellbore region. In a matrix acidizing treatment, the acid used (for example hydrochloric acid for carbonates) is injected at a pressure low enough to prevent formation fracturing. When injected at low rates into carbonate formations, the acid can form conductive wormholes that extend radially from the wellbore. Acids can also be injected into subterranean formation at rates high enough to cause fracturing. In this case, the acid unevenly dissolves the walls of the fracture, so that when the injection is stopped and the fracture closes, conductive channels to the well remain.

One of the problems often encountered in the application of acids, especially inorganic acids, at elevated carbonate reservoir temperatures, is their excessive reaction rate toward carbonate originating from a lack of restriction to the mobility of the protons. For example, HCl is very reactive, and at higher temperatures (such as 200° F. and higher) and/or low injection rates, favors facial dissolution over wormholing. For this reason, less reactive acid formulations have been pursued. One approach is to use organic acids such as formic and acetic acid. Organic acids have higher $pK_a$'s than HCl, but will not completely spend in the reservoir.

Numerous approaches have been applied toward retarding the acid reactivity, mainly via physical means. For example, it is common in oilfield operations to encapsulate inorganic acid into shells of polymer gel, linear or crosslinked, or light oils in the presence of surfactant and/or chelating agent. Each of these options offers a certain level of performance, but at the same time brings several undesirable side effects.

At present, acid treatments are plagued by two primary limitations namely, limited radial penetration and severe corrosion to pumping and wellbore tubing. Both effects are associated with the higher-than-desired reaction rate (or spending rate) of inorganic acids, such as HCl, toward carbonate surface, in particular at higher temperatures. Limitations on radial penetration are caused by the fact that as soon as the acid, in particular inorganic acids, such as by nonlimiting example, HCl, is introduced into the formation or wellbore, it reacts instantaneously with the formation matrix and/or the wellbore scaling. In practice, the dissolution is so rapid that the injected acid is spent by the time it reaches no more than a few inches beyond the wellbore, incapable of generating much desired fracture length far from the wellbore. Organic acids (e.g., formic acid, acetic acid and/or lactic acid and its polymeric version) are sometimes used to address limitations on radial penetration since organic acids react more slowly than inorganic acids. Increasingly, retarded acid systems, which use techniques such as gelling the acid or oil-wetting the formation, are used. Each of such alternatives, however, has associated drawbacks and is an imperfect solution to limited radial penetration.

Other limitations related to the use of acids are: 1) very high miscibility of acids with water when the potential for undesirable migration of the acid-bearing fluid into a water-saturated zone is a concern; and 2) iron precipitation, especially in sour wells, where the iron sulfide scale formed in boreholes, tubulars, and/or formations is dissolved by the acid with the formation of hydrogen sulfide ($H_2S$) and undesirable iron precipitates such as ferric hydroxide or ferrous sulfide that affect the permeability of the formation. Therefore, acid treatment fluids often contain additives to minimize iron precipitation and $H_2S$ evolution, for example by sequestering the iron ions in solution, or by reducing ferric ions to the more soluble ferrous form of iron.

The performance of a fracture acidizing treatment job may be measured by the length of the fracture that is effectively acidized. The distance a reactive acid travels along the fracture (e.g., acid penetration depth), is governed by the acid flow (injection) rate and the acid reaction (spending) rate at the rock surface. In most of the circumstances encountered in acid treatment, the reaction rate between acid and rock is very fast, and the rate determining step is acid mass transfer from bulk to rock surface.

In fracture acidizing, the treatment fluid used is injected at a pressure high enough to cause formation fracturing, designed to open sustained flowpath network that connects limestone and/or dolomite reservoirs to the wellbore. In order to achieve deeper penetration in fracture acidizing, it is often desirable to retard the acid in such treatments as well. Common approaches to acid retardation for fracture acidizing include gelling and to a minor extent chemical intervention. Each of these methodologies brings certain advantages that are invariably accompanied by a set of disadvantages. For example, gelled acids provide moderate retardation in the temperature range of 80 to 200° F. As gels exhibit high viscosity and low friction loss, they function primarily as diverting agents, contributing to fluid loss reduction. It is also common practice to retard acid using surfactants, although limited acid retardation is obtained. However, the deployment of surfactant alone also carries a few unwanted effects. For example, it could strip any existing coating on carbonate surfaces and as such act as an accelerator. Therefore, retardation schemes relying on surfactant films are often unreliable and ineffective. Furthermore, the attempt to use biodegradable, solid acid precursors such as polylactic acid in acidizing treatments has been plagued by the intrinsic disadvantage of very small acid capacity, leading to prohibitive costs and cumbersome dependency on formation temperature range which governs the rate of degradation.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In a first aspect of the disclosure, a multi-phase aqueous composition(s) include: a surfactant; a first phase including water, an acid, and a water-soluble acid retarding agent; and a second phase selected from the group consisting of an immiscible organic phase, a gas, and combinations thereof.

In another aspect of the disclosure, method(s) include treating a subterranean formation fluidly coupled to a wellbore with a treatment fluid including the multi-phase aqueous composition.

In another aspect of the disclosure, method(s) include: treating a subterranean formation fluidly coupled to a wellbore with a treatment fluid including a multi-phase aqueous composition containing: a surfactant including a foaming agent; a first phase including water, an acid, and a water-soluble acid retarding agent; and a second phase including a gas selected from the group consisting of nitrogen, carbon dioxide, oxygen, helium, argon, hydrogen, methane or ethane, or a combination thereof; wherein the multi-phase aqueous composition is in the form of a foam.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
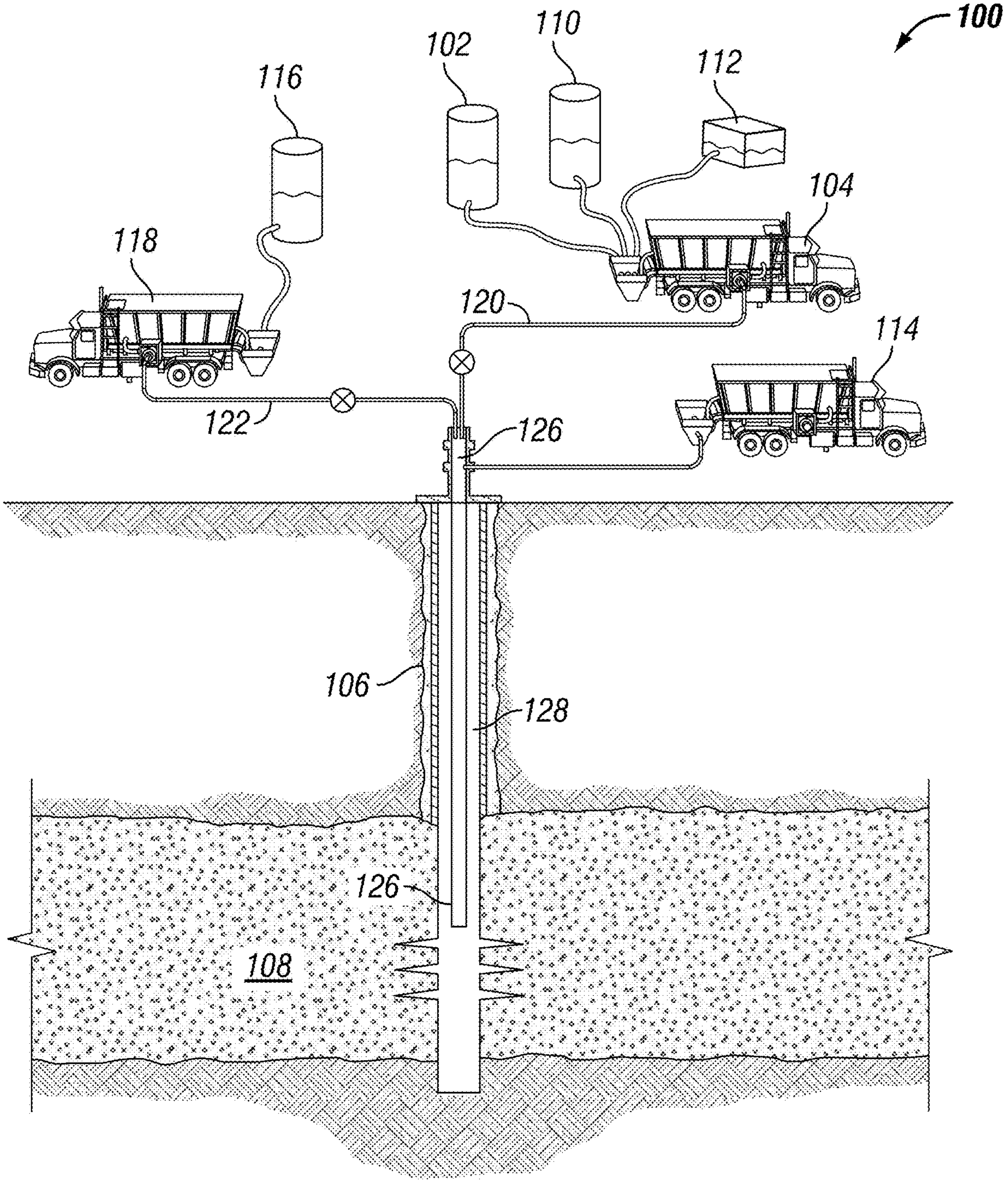
FIG. 1 depicts an example of equipment used to treat a wellbore and/or a formation fluidly coupled to the wellbore according to some embodiments of the disclosure.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount range listed or described as being useful, suitable, or the like, is intended that any and every concentration or amount within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The terms "formation" or "subterranean formation" as utilized herein should be understood broadly, and are used interchangeably. A formation includes any underground fluidly porous formation, and can include without limitation any oil, gas, condensate, mixed hydrocarbons, paraffin, kerogen, water, and/or $CO_2$ accepting or providing formations. A formation can be fluidly coupled to a wellbore, which may be an injector well, a producer well, and/or a fluid storage well. The wellbore may penetrate the formation vertically, horizontally, in a deviated orientation, or combinations of these. The formation may include any geology, including at least a sandstone, limestone, dolomite, shale, tar sand, and/or unconsolidated formation. The wellbore may be an individual wellbore and/or a part of a set of wellbores directionally deviated from a number of close proximity surface wellbores (e.g. off a pad or rig) or single initiating wellbore that divides into multiple wellbores below the surface.

The term "oilfield treatment fluid" as utilized herein should be understood broadly. In certain embodiments, an oilfield treatment fluid includes any fluid having utility in an oilfield type application, including a gas, oil, geothermal, or injector well. In certain embodiments, an oilfield treatment fluid includes any fluid having utility in any formation or wellbore described herein. In certain embodiments, an oilfield treatment fluid includes a matrix acidizing fluid, a wellbore cleanup fluid, a pickling fluid, a near wellbore damage cleanup fluid, a surfactant treatment fluid, an unviscosified fracture fluid (e.g. slick water fracture fluid), and/or any other fluid consistent with the fluids otherwise described herein. An oilfield treatment fluid may include any type of additive known in the art, which are not listed herein for purposes of clarity of the present description, but which may include at least friction reducers, inhibitors, surfactants and/or wetting agents, fluid diverting agents, particulates, acid retarders (except where otherwise provided herein), organic acids, chelating agents, energizing agents (e.g. $CO_2$ or $N_2$), gas generating agents, solvents, emulsifying agents, flowback control agents, resins, breakers, and/or non-polysaccharide based viscosifying agents.

The term "high pressure pump" as utilized herein should be understood broadly. In certain embodiments, a high pressure pump includes a positive displacement pump that provides an oilfield relevant pumping rate—for example at least 0.5 barrels per minute (bpm), although the specific example is not limiting. A high pressure pump includes a pump capable of pumping fluids at an oilfield relevant pressure, including at least 500 psi, at least 1,000 psi, at least 2,000 psi, at least 5,000 psi, at least 10,000 psi, up to 15,000 psi, and/or at even greater pressures. Pumps suitable for oilfield cementing, matrix acidizing, and/or hydraulic fracturing treatments are available as high pressure pumps, although other pumps may be utilized.

The term "treatment concentration" as utilized herein should be understood broadly. A treatment concentration in the context of an HCl concentration is a final concentration of the fluid before the fluid is positioned in the wellbore and/or the formation for the treatment, and can be any concentration necessary to provide sufficient acidic function. The treatment concentration may be the mix concentration available from the HCl containing fluid at the wellsite or other location where the fluid is provided from. The treatment concentration may be modified by dilution before the treating and/or during the treating. Additionally, the treatment concentration may be modified by the provision of additives to the fluid. In certain embodiments, a treatment concentration is determined upstream of additives delivery (e.g. at a blender, hopper, or mixing tub) and the concentration change from the addition of the additives is ignored. In certain embodiments, the treatment concentration is a liquid phase or acid phase concentration of a portion of the final fluid—for example when the fluid is an energized or emulsified fluid.

Multi-phase aqueous compositions described below and useful in accordance with the disclosure exhibit a retarded acid reactivity that facilitates greater depth of fracture and/or matrix acidizing. The multi-phase aqueous composition can comprise, consist of, or consist essentially of: a surfactant; a first phase comprising water, an acid, and a water-soluble acid retarding agent; and a second phase selected from the group consisting of an immiscible organic phase, a gas, and combinations thereof.

The acid in the first phase can be selected from the group consisting of hydrochloric acid (HCl), nitric acid, phosphoric acid, sulfuric acid, hydrofluoric acid, hydrobromic acid, perchloric acid, hydrogen iodide, alkanesulfonic acids, arylsulfonic acids, acetic acid, formic acid, alkyl carboxylic acids, acrylic acid, lactic acid, glycolic acid, malonic acid, fumaric acid, citric acid, tartaric acid, or their derivatives, and mixtures thereof. Generally, an acid is transported to a wellsite. According to some embodiments, the acid is present in the multi-phase aqueous compositions in an amount up to about 36 wt %, or from about 7.5 to about 36 wt %, or from about 7.5 to about 28 wt %, or from about 7.5 to about 20 wt %, based on the total weight of the composition. In some other embodiments, acid is present in the multi-phase aqueous compositions in an amount of at least about 37 wt %.

In some embodiments, an acid that has shown particular utility in the multi-phase aqueous composition(s) according to the disclosure is hydrochloric acid. In some other embodiments, the multi-phase aqueous composition may include an amount of hydrofluoric acid (HF). HF exhibits distinct reactions from HCl, and is useful in certain applications to enhance the activity of the resulting multi-phase aqueous solution. For example, HF is utilized in the cleanup of sandstone formations where HCl alone is not effective for removing certain types of formation damage. It is believed that the present multi-phase aqueous solution will have effects with HF similarly to the observed effects with HCl. Accordingly, multi-phase solutions can be formulated with a total acid amount that is much higher than presently attainable formulations. In yet another embodiment, the HF is present in the multi-phase aqueous composition in an amount of at least 0.25% by weight. The HF may be present in addition to the amount of HCl, and/or as a substitution for an amount of the HCl.

The water-soluble acid retarding agent has utility in retarding the rate at which the acid solution reacts with carbonate-mineral, or other surfaces inside the formation.

Thus, the water-soluble acid retarding agent may slow the reactivity of the acid towards the carbonate-mineral surfaces, without compromising its acid capacity. Such retardation is useful in the context of stimulating or improving production from subterranean formations that contain hydrocarbons, steam, geothermal brines and other valuable materials as known in the art. Slowing the rate of reaction may allow deeper penetration of the acid into the subterranean formations than regular acid, thereby increasing the formation permeability and productivity. Water-soluble acid retarding agents, as used herein, includes any water-soluble material that reduces acid activity through a mechanism other than mere dilution. The water-soluble retarding agents of the first phase can be selected from the group consisting of a salt, urea or one of its derivatives, an alpha-amino acid, a beta-amino acid, a gamma-amino acid, an alcohol with one to five carbons, a surfactant having a structure in accordance with Formula I, and combinations thereof:

Formula I

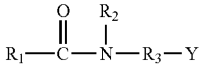

in which $R_1$ is a hydrocarbyl group that may be branched or straight chained, aromatic, aliphatic or olefinic and contains from about 1 to about 26 carbon atoms and may include an amine; $R_2$ is hydrogen or an alkyl group having from 1 to about 4 carbon atoms; $R_3$ is a hydrocarbyl group having from 1 to about 5 carbon atoms; and Y is an electron withdrawing group.

Such salt(s) can comprise: i) a cation selected from the group consisting of lithium, sodium, potassium, rubidium, cesium, beryllium, magnesium, calcium, strontium, barium, scandium, yttrium, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, zinc, cadmium, mercury, boron, aluminum, gallium, indium, thallium, tin, ammonium, alkylammonium, dialkylammonium, trialkylammonium and tetraalkylammonium, and combinations thereof; and ii) an anion selected from the group consisting of fluoride, chloride, bromide, iodide, sulfate, bisulfate, sulfite, bisulfite nitrate, alkanesulfonates, arylsulfonates, acetate, formate, and combinations thereof.

The amount of water-soluble acid retarding agent(s) present in the composition can be any concentration necessary to provide sufficient acid retardation function. According to the present embodiments, the water-soluble acid retarding agent(s) is added to the first phase of the multi-phase aqueous composition in an amount up to its solubility limit in the first phase. According to some embodiments, the water-soluble acid retarding agent is present in the multi-phase aqueous compositions in an amount of up to about 40 wt %, from about 1 to about 40 wt %, from about 5 to about 35 wt %, or from about 5 to about 20 wt %, based on the total weight of the multi-phase aqueous composition.

In some embodiments, the first phase of the multi-phase aqueous composition may include HCl as the acid in a weight fraction exceeding 37%, based on the total weight of the composition. The water-soluble acid retarding agent present in some multi-phase aqueous compositions useful in accordance with the disclosure allows the HCl fraction to exceed the 37% normally understood to be the limit of HCl solubility at atmospheric pressure. Such water-soluble acid retarding agents include at least one salt compound and urea, or urea derivative. Above 37%, normally, the evolution of HCl gas from the solution prevents the HCl fraction from getting any higher. In one or more embodiments, the HCl weight fraction of the multi-phase aqueous solution may be as high as 45.7 wt %.

Without being bound by any particular theory, inventors envisage mechanisms that inhibit acid activity. The first involves the disruption of the hydrogen-bonded network of water. In the Grotthuss proton-hopping mechanism, protons move in water not through Brownian motion, but rather charge transport through shifting hydrogen bonds. Solutes are known to disrupt the Grotthuss mechanism by interacting with water themselves, rather than allowing protons to associate freely. This slows the proton transport to the wormhole wall during a matrix acidizing treatment. The introduction of solutes such as the water-soluble acid retarding agent(s) also has a similar second effect by simply replacing water. The lack of water molecules crowds the fluid and limits the diffusion of protons.

A second mechanism involves the dissociation of acids in solution. As mentioned, organic acids have higher $pK_a$'s than HCl, making the protons from these acids less available for reaction. In some aspects of the disclosure, compounds that lower the polarizability (as indicated by the dielectric constant) of water are used, which therefore decrease the proton dissociation of acids. It is believed that aqueous solutes can modify the activity of acids in water in one or both of these mechanisms.

A parameter that quantifies the retardation of the acid is the retardation factor. As described herein, the retardation factor indicates the ratio of apparent surface reaction rates. According to the present embodiments, the retardation factor of the multi-phase aqueous composition is higher or equal to a retardation factor of a second solution of acid of a same concentration as the acid comprised in the multi-phase aqueous composition without the water-soluble acid retarding agent. For example, in various embodiments, the multi-phase aqueous composition may exhibit an acid retardation factor higher than or equal to about 3, at least about 5, or at least about 11 at about 70° F. At about 200° F., the composition may exhibit an acid retardation factor higher than or equal to about 3, higher than or equal to about 5, or even higher than or equal to about 7.

Water can be present in the first phase of the multi-phase aqueous composition in an amount sufficient to dissolve the acid and the water-soluble acid retarding agent. According to embodiments according to the disclosure, the water concentration included in the multi-phase aqueous composition may be greater than 0 wt % and lower or equal to 80 wt %, based on the total weight of the multi-phase aqueous composition. In various embodiments, the water concentration may be lower than 60 wt %, or lower than 40 wt % or lower than 20 wt %, and equal to or higher than 8 wt %, or equal to or higher than 10 wt %, or lower than 8 wt %, based on the total weight of the multi-phase aqueous composition.

According to some embodiments, an amount of water is mixed with a water-soluble acid retarding agent, where the amount of water is present in an amount between 0.3 and 5 times the mass of the water-soluble acid retarding agent, where any lower limit can be 0.35, 0.4, or 0.45 and any upper limit can be 1.0, 1.2, 1.25, where any lower limit can be combined with any upper limit. The procedure further includes dissolving an amount of acid into the combined amount of water and water-soluble acid retarding agent in the first phase. The acid, such as HCl, may be added by any method, such as bubbling HCl gas through the solution. The dissolving of the HCl may occur after dissolving of the water-soluble acid retarding agent, simultaneous with the dissolving of the water-soluble acid retarding agent, or at least partially before the dissolving of the water-soluble acid retarding agent. The amount of HCl gas is in a molar ratio of between 4.0 and 0.5 times the amount of the water-soluble acid retarding agent. In yet another embodiment, the procedure includes dissolution of at least a portion of the water-soluble acid retarding agent in the water during the dissolution of the HCl in the combined water and water-soluble acid retarding agent. Example operations include beginning the dissolution of the HCl and adding the water-soluble acid retarding agent as a solid or a solution, providing some of the water-soluble acid retarding agent in solution with the water and some of the water-soluble acid retarding agent as a solid, and/or providing the water-soluble acid retarding agent as a solid in the water and dissolving the HCl into the water while dissolving the water-soluble acid retarding agent.

According to some embodiments, the gas can be selected from the group consisting of nitrogen, carbon dioxide, oxygen, helium, argon, hydrogen, methane or ethane, or a combination thereof. According to some embodiments, the immiscible organic phase can be any organic material at least partially immiscible in water. The immiscible organic phase can be selected from the group consisting of alkanes, cycloalkanes, aromatic compounds, heteroaromatic compounds, and combinations thereof.

The foaming agent can be selected from the group consisting of an ethoxylated nonionic surfactant, a cationic surfactant, an anionic surfactant, a zwitterionic surfactant and combinations thereof.

According to some embodiments, the multi-phase aqueous composition can be in the form of a foam. In such embodiments, and in other embodiments, the surfactant can be the foaming agent and the second phase can comprise the gas.

According to some embodiments, the second phase comprises the immiscible organic phase and the multi-phase aqueous composition can be in the form of an emulsion where the first phase is a continuous phase and the second phase is a discontinuous phase and is stabilized by the surfactant, referred to as an oil in acid (O/A) emulsion. In such embodiments, the surfactant can be an ethoxylated nonionic surfactant of the structure $RO(CH_2CH_2O)_nH$, where R can be any alkyl group of 6 to 18 carbons, and $1 \leq n \leq 10$. The multi-phase aqueous composition in the form of an O/A emulsion can be pumped through a wellbore and into a subterranean carbonate containing formation at a rate at which the formation does not fracture. In accordance with some embodiments, the formation bears petroleum deposits, potentially with precipitated paraffins or asphaltenes that are causing formation damage. The multi-phase aqueous composition in the form of an O/A emulsion can perform two functions as it enters the formation of interest. It can create a conductive wormhole, longer than an unretarded acid would in a matrix acidizing treatment. Also, the internal oil phase will dissolve the organic damage, also improving production.

According to some embodiments, the second phase comprises the immiscible organic phase and the multi-phase aqueous composition can be in the form of an emulsion where the second phase is a continuous phase and the first phase is a discontinuous phase and is stabilized by the surfactant, referred to as an acid in oil (A/O) emulsion. In such embodiments, the surfactant can be a cationic surfactant of the structure $[RNXYZ]^+ A^-$, where R is an alkyl chain of 10 to 18 carbons. X, Y and Z are selected from the group consisting of methyl, ethyl, hydroxyethyl or benzyl. X, Y and Z can be the same or different. A is an anion selected from the group consisting of fluoride, chloride, bromide, iodide, acetate, sulfate, alkylsulfonate or arylsulfonate. The multi-phase aqueous composition in the form of an A/O emulsion can be pumped through a wellbore and into a subterranean carbonate containing formation at a rate that will not create enough pressure to fracture the formation. As the emulsified acid enters the formation, conductive wormholes are formed that extend radially from the wellbore. Normalized to treatment volume, wormholes formed from emulsified acids and acids with water-soluble retarding agents tend to extend farther than those from straight acid. A combination of the two chemistries is expected to improve wormhole penetration even further.

In accordance with some embodiments, the multi-phase aqueous composition in the form of an A/O emulsion can be pumped into the carbonate formation at rates that are high enough to create a fracture in the formation. The emulsified acid flows into the fracture, growing its length and height while dissolving conductive channels that create pathways from the distal parts of the formation to the wellbore. The A/O emulsion will prevent leak-off of the acid into the formation, meaning that more acid will be spent on the fracture surface. The water-soluble retarding agent will slow the reaction of HCl with fracture surface and carve out longer channels in the fracture.

In accordance with some embodiments, method(s) can comprise, consist of, or consist essentially of providing the multi-phase aqueous compositions, as described herein, and treating a formation fluidly coupled to a wellbore with an oilfield treatment fluid comprising the multi-phase aqueous composition.

In accordance with some embodiments, the multi-phase aqueous composition can be in the form of a foam prepared by: introducing the acid, the water-soluble retarding agent and the foaming agent into a carbonate formation, reacting the acid with the carbonate formation, generating carbon dioxide, entraining the carbon dioxide into the foaming agent of the multi-phase aqueous composition, creating a low-density foam that will help lift the spent (reduced acid content) multi-phase aqueous composition from the formation of the well and aid in returning the well to production. Additionally, if the formation already contains gases, such as low molecular weight hydrocarbons (methane, ethane, propane, etc), hydrogen sulfide or carbon dioxide, these can also form part of the foam.

In accordance with some embodiments, method(s) can comprise, consist of, or consist essentially of treating a formation fluidly coupled to a wellbore with an oilfield treatment fluid comprising the multi-phase aqueous composition(s) in the form of a foam, as described in embodiments herein, where the surfactant comprises a foaming agent, and the second phase comprises the gas. At pumping rates high enough to fracture the formation, the multi-phase aqueous composition in the form of a foam can enter the fracture, but not much of the fluid in such foam will enter the porous medium composing the walls of the fracture. The acid's reaction rate has also been retarded, and coupled with lower losses to the formation, should create a stimulated zone that extends further from the wellbore.

In accordance with some embodiments, the multi-phase aqueous composition in the form of a foam can be used to divert fluids from a high permeability zone to low permeability zone in the reservoir. The multi-phase aqueous composition in the form of a foam can create high pressure drop due to multiphase flow in the porous media. This excessive pressure build up in the wellbore helps in diverting acid to low permeability zones. In some embodiments, injecting the multi-phase aqueous composition in the form of a foam below the fracture pressure of the reservoir will allow the multi-phase aqueous composition in the form of a foam to enter the formation and penetrate farther into the reservoir than a regular acid treatment. The pressure build up will help in diverting a part of the multi-phase aqueous composition in the form of a foam into the low permeability zone. The resulting treatment will have deeper acid penetration in both low and high permeability zones compared to a regular acid treatment.

In some embodiments, the multi-phase aqueous composition in the form of a foam can also be formed by: i) introducing the surfactant and the first phase into the formation, and ii) separately introducing the gas into the formation for contact with the surfactant and the first phase with sufficient energy to form the multi-phase aqueous composition in the form of a foam.

Further, it is also within the scope of the present disclosure that the multi-phase aqueous compositions may be combined with one or more other additives known to those of skill in the art, such as, but not limited to, corrosion inhibitors, scale inhibitors, foaming agents, hydrogen sulfide scavengers, reducing agents and/or chelants, and the like.

The corrosion inhibitor is typically provided in liquid form and is mixed with the other components of the treatment fluid at the surface and then introduced into the formation. The corrosion inhibitor system is present in the treatment fluid in an amount of from about 0.2% to about 5% or about 0.2% to about 3% by total weight of the treatment fluid. The corrosion inhibitor used with the fluids of the present disclosure includes an alkyl, alkenyl, alicyclic or aromatic substituted aliphatic ketone, which includes alkenyl phenones, or an aliphatic or aromatic aldehyde, which includes alpha, or beta-unsaturated aldehydes, or a combination of these. Alkyl, alicyclic or aromatic phenone and aromatic aldehyde compounds may also be used in certain applications. Other unsaturated ketones or unsaturated aldehydes may also be used. Alkynol phenone, aromatic and acetylenic alcohols and quaternary ammonia compounds, and mixtures of these may be used, as well. These may be dispersed in a suitable solvent, such as an alcohol, and may further include a dispersing agent and other additives.

Chelating agents are materials that are employed, among other uses, to control undesirable reactions of metal ions. In oilfield chemical treatments, chelating agents are frequently added to matrix stimulation acids to prevent precipitation of solids (metal control) as the acids spend on the formation being treated. These precipitates include iron hydroxide and iron sulfide. In addition, chelating agents are used as components in many scale removal/prevention formulations. Two different types of chelating agents may be used: polycarboxylic acids (including aminocarboxylic and acids polyaminopolycarboxylic acids) and phosphonates. The non-surface active substituted ammonium containing amino acid derivatives may act as chelating agents when present in the treatment fluid in amount of from about 0.05% to about 10% or from about 1 wt % to about 5 wt %, based upon total weight percent of the treatment fluid.

Some embodiments according to present disclosure are methods for treating a formation penetrated by a wellbore. The methods involve providing an oilfield treatment fluid including the multi-phase aqueous composition(s) described in this disclosure to a high pressure pump and operating the high pressure pump to treat at least one of a wellbore and the formation fluidly coupled to the wellbore. The operation of the pump may include at least one of (i) injecting the oilfield treatment fluid into the formation at matrix rates; (ii) injecting the oilfield treatment fluid into the formation at a pressure equal to a pressure that fractures the formation; and (iii) contacting at least one of the wellbore and the formation with the oilfield treatment fluid.

Referring now to FIG. 1, a system 100 used to treat a wellbore 106 and/or a formation 108 fluidly coupled to the wellbore 106 is depicted. The formation 108 may be any type of formation with a bottom hole temperature up to about 204° C. (400° F.). In various embodiments the temperature is at least 38° C. (100° F.). The temperature may also range from about 38° C. to about 204° C. The wellbore 106 is depicted as a vertical, cased and cemented wellbore 106, having perforations providing fluid communication between the formation 108 and the interior of the wellbore 106. However, the particular features of the wellbore 106 are not limiting, and the example provides an example context 100 for a procedure.

The system 100 includes a high-pressure pump 104 having a source of the multi-phase aqueous composition 102, as described herein. The high pressure pump 104 is fluidly coupled to the wellbore 106, through high pressure lines 120 in the example. The example system 100 includes tubing 126 in the wellbore 106. The tubing 126 is optional and non-limiting. In various embodiments, the tubing 126 may be omitted, a coiled tubing unit (not shown) may be present, and/or the high pressure pump 104 may be fluidly coupled to the casing or annulus 128. The tubing or casing may be made of steel.

Certain additives (not shown) may be added to the multi-phase aqueous composition 102 to provide, or as a part of, an oilfield treatment fluid. Additives may be added at a blender (not shown), at a mixing tub of the high pressure pump 104, and/or by any other method. In one or more embodiments, a second fluid 110 may be a diluting fluid, and the multi-phase aqueous composition 102 combined with some amount of the second fluid 110 may make up the oilfield treatment fluid. The diluting fluid may contain no acid, and/or acid at a lower concentration than the multi-phase aqueous composition 102. The second fluid 110 may additionally include any other materials to be added to the oilfield treatment fluid, including additional amounts of a water-soluble acid retarding agent. In certain embodiments, an additional water-soluble acid retarding agent solution 112 is present and may be added to the multi-phase aqueous composition 102 during a portion when the multi-phase aqueous composition 102 is being utilized. The additional water-soluble acid retarding agent solution 112 may include the same or a different water-soluble acid retarding agent from the multi-phase aqueous composition 102, and/or may include water-soluble acid retarding agent at a distinct concentration from the multi-phase aqueous composition.

The high pressure pump 104 can treat the wellbore 106 and/or the formation 108, for example by positioning fluid therein, by injecting the fluid into the wellbore 106, and/or by injecting the fluid into the formation 108. Example and non-limiting operations include any oilfield treatment without limitation. Potential fluid flows include flowing from the high-pressure pump 104 into the tubing 126, into the formation 108, and/or into the annulus 128. The fluid may be recirculated out of the well before entering the formation 108, for example utilizing a back side pump 114. Referring still to FIG. 1, the annulus 128 is shown in fluid communication with the tubing 126. In various embodiments, the annulus 128 and the tubing 126 may be isolated (e.g. with a packer). Another example fluid flow includes flowing the oilfield treatment fluid into the formation at a matrix rate (e.g. a rate at which the formation is able to accept fluid flow through normal porous flow), and/or at a rate that produces a pressure exceeding a hydraulic fracturing pressure. The fluid flow into the formation may be either flowed back out of the formation, and/or flushed away from the near wellbore area with a follow up fluid. Fluid flowed to the formation may be flowed to a pit or containment (not shown), back into a fluid tank, prepared for treatment, and/or managed in any other manner known in the art. Acid remaining in the returning fluid may be recovered or neutralized.

Another example fluid flow includes the multi-phase aqueous composition 102 including an acid and water-soluble acid retarding agent. The example fluid flow includes a second aqueous solution 116 including water-soluble acid retarding agent. The fluid flow includes, sequentially, a first high pressure pump 104 and a second high pressure pump 118 treating the formation 108. As seen in FIG. 1, the second high-pressure pump 118 is fluidly coupled to the tubing 126 through a second high pressure line 122. The fluid delivery arrangement is optional and non-limiting. In one embodiment, a single pump may deliver both the multi-phase aqueous solution 102 and the second aqueous solution 116. In yet another example, either the multi-phase aqueous solution 102 or the second aqueous solution 116 may be delivered first, and one or more of the solutions 102, 116 may be delivered in multiple stages, including potentially some stages where the solutions 102, 116 are mixed.

The following examples are presented to further illustrate the preparation and properties of the wellbore fluids of the present disclosure and should not be construed to limit the scope of the disclosure, unless otherwise expressly indicated in the appended claims.

EXAMPLES

Emulsions were prepared from an aqueous phase containing hydrochloric acid (15% w/v, that is, 15 g HCl/100 ml water) and a water-soluble retarding agent (19% w/v, either magnesium chloride or urea) and a diesel fuel organic phase. The emulsions were ~70% aqueous phase and ~30% organic phase by volume. Different surfactants useful for i) creating an acid-in-oil (A/O) emulsion, and ii) creating an oil-in-acid (O/A) emulsion, were added at 0.5% to create and stabilize the emulsions. In this non-limiting example, the A/O emulsion is stabilized by a cationic surfactant and the O/A emulsion is stabilized by an ethoxylated nonionic surfactant. The mixtures were homogenized by vigorous shaking, and allowed to stand. The A/O emulsions (containing either magnesium chloride or urea) separated ~10% of their volume as top oil. Both required over one hour for separation, indicating a very stable emulsion. The O/A emulsions containing magnesium chloride and urea in the aqueous phase required 22 minutes and 15 minutes, respectively, to fully separate.

Various formulations were prepared using different retarding agents and HCl as the acid. A series of tests were conducted to evaluate these formulations. To fully assess the properties of the prepared formulations, the tests were conducted in an autoclave under up to 3000 psi hydrostatic pressure, with the thermal energy transmitted through a silicone oil bath. To determine the retardation factor (RF) of certain additives, formation response tests were conducted with different acid formulations. In the experiments, Indiana limestone cores, which were 1 inch in diameter by 6 inches in length, were held at ~2800 psi confining pressure to ensure that no fluids channeled around the sides, and were heated to desired temperature. The acid fluids were flowed through the core, with a ~1200 psi back pressure, which were conditions provided so the acid will preferentially form wormholes. When the wormhole extended the entire length of the core, the pressure drops across the core approached zero, which was indicative that the fluid was no longer flowing through porous medium, but rather what approximated a tortuous pipe.

Figure 2:
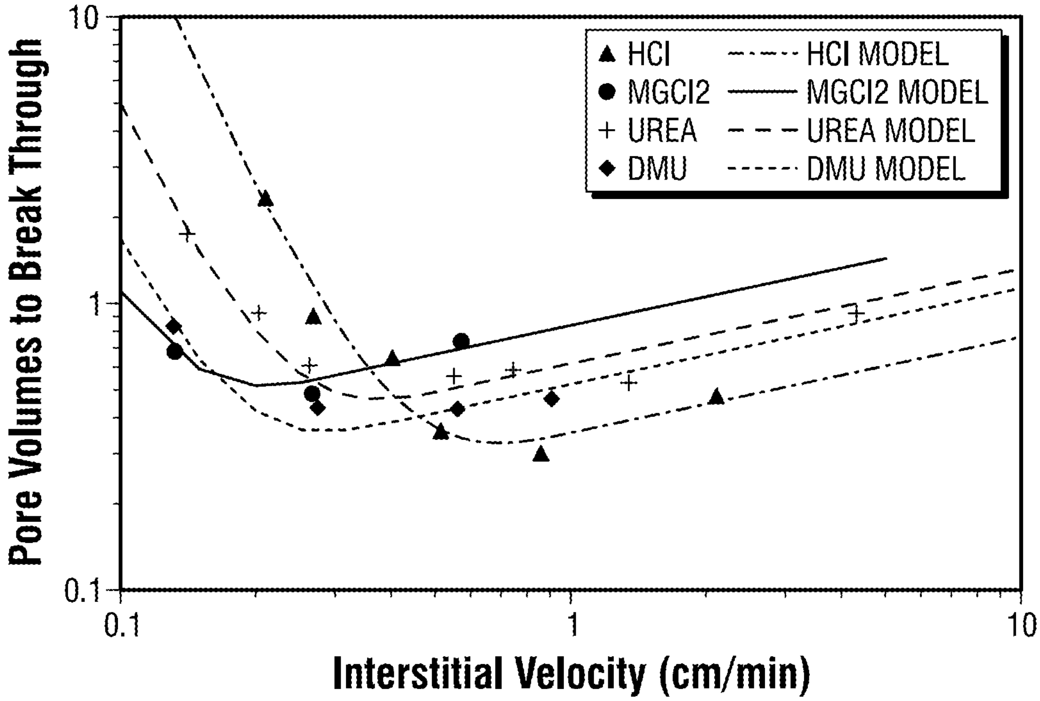
FIG. 2 shows pore volumes to break through versus interstitial velocity curves for aqueous acid solutions based upon tests performed at 70° F., according to the disclosure.
Figure 3:
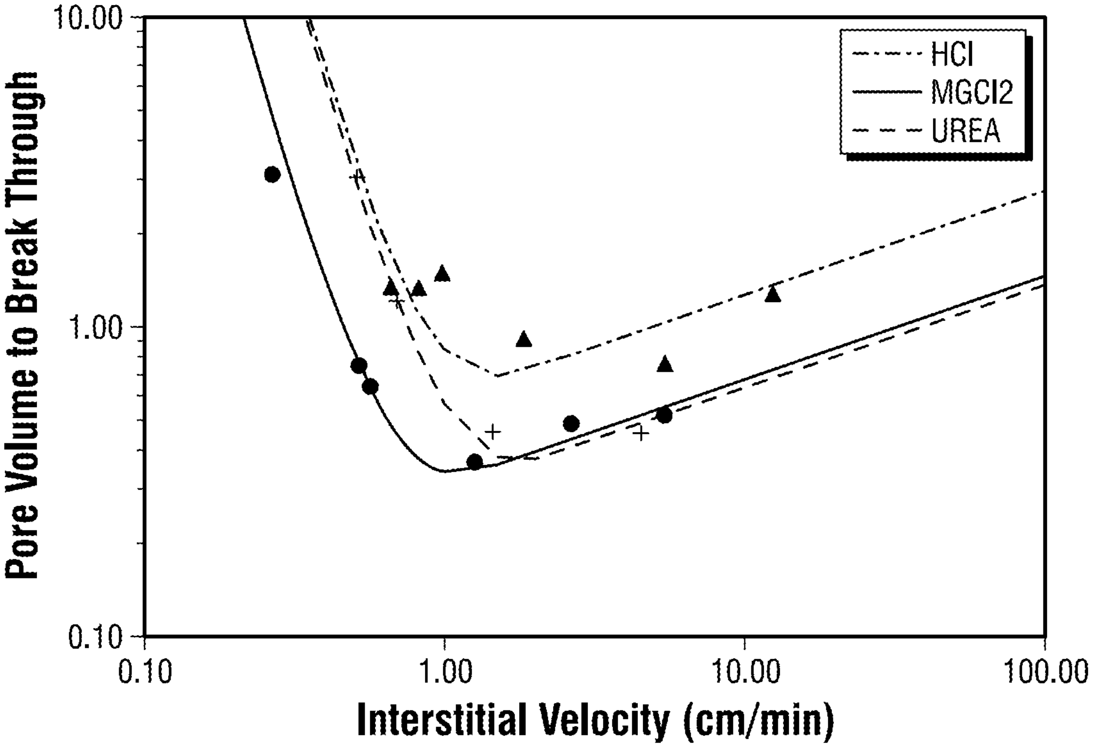
FIG. 3 shows pore volumes to break through versus interstitial velocity curves for aqueous acid solutions based upon tests performed at 200° F., according to the disclosure.

The number of pore volumes of fluid required to create the wormholes was a function of the acid injection velocity ($u_i$, FIGS. 2 and 3). The optimal injection velocity ($u_{i-opt}$) is that which requires the lowest number of pore volumes for the wormhole to break through the core. Using this approach, pore volume to break through ($PV_{BT}$) curves versus interstitial velocity curves were generated and the $u_{i-opt}$ and RF calculated for each acid formulation (Table 1) at 70° F. (FIGS. 2) and 200° F. (FIG. 3).

TABLE 1

Retardation Factors of Acid Formulations

| Entry | Temperature (° F.) | Retarding Agent Additive | Retarding Agent concentration (% by weight) | Estimated retardation factor (RF) |
|---|---|---|---|---|
| 1 | 70 | none | — | — |
| 2 | | urea | 18.5 | 3.3 |
| 3 | | N,N'-dimethyl urea (DMU) | 27 | 5.8 |
| 4 | | $MgCl_2$ | 19 | 10.9 |
| 5 | 200 | none | — | — |
| 6 | | urea | 18.5 | 1.3 |
| 7 | | $MgCl_2$ | 19 | 3.1 |

The estimated retardation factor was calculated according to the following equation:

$$RF_x \sim \left(\frac{u_{i-opt,HCl}}{u_{i-opt,x}}\right)^2$$

All aqueous fluids evaluated contained hydrochloric acid (15% weight/volume) and a corrosion inhibitor (0.6% by volume). The results demonstrate that compounds which disrupt the hydrogen bonding network of water and its dielectric constant are able to retard the activity of acid in subterranean formations. In particular, magnesium chloride ($MgCl_2$) used as a retarding agent showed significant retardation at similar or lower concentrations than the other retarding evaluated.

Figure 4A:
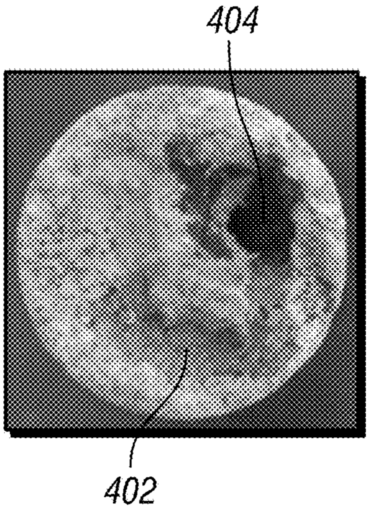
FIGS. 4A-4E depict face dissolution of core samples evaluated in accordance with the disclosure; and, FIG. 5 shows calcium generation concentration versus time curves for some aqueous acid solutions evaluated, according to the disclosure.
Figure 4B:
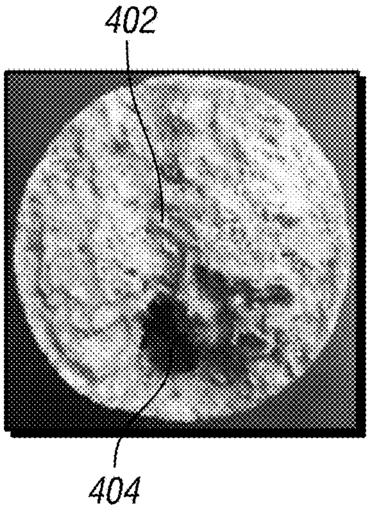
Figure 4C:
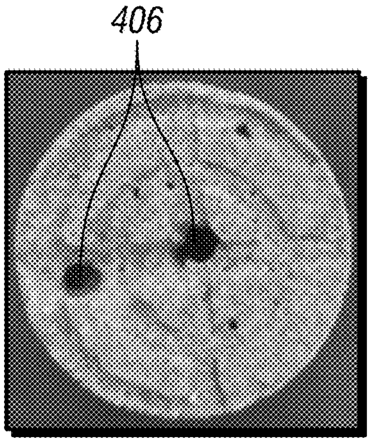

Wormholes in carbonate formations can acquire different structures depending on the rate of acid injection. At very low injection rates, there is no wormhole at all, as only the face of the formation dissolves. Wormholes that do form at low injection rates tend to be broad and conical. Close to the optimum injection rate, a dominant, narrow wormhole forms with a small amount of branching. When the injection rate is increased past the optimum injection rate, the acid is forced into less permeable zones and creates a ramified (highly branched) wormhole. Ramified structures will transition to uniformly dissolved rock at very high injection rates. By comparing the characteristics of the injection face of the cores from the acid injection experiment described in evaluations above, estimates of the wormhole characteristics can be made. Table 2 provides the low acid injection rates, break through times and pore volumes, from the evaluations above at 200° F., and FIGS. 4A-4C graphically illustrate the core face images and break through characteristics at low acid injection rates at 200° F.

TABLE 2

| Core face images and break through characteristics at low acid injection rates at 200° F. | | | |
|---|---|---|---|
| Fluid => | 15% HCl | 15% HCl + 18.5% urea | 15% HCl + 19% $MgCl_2$ |
| Injection rate (ml/min) | 0.2 | 0.3 | 0.2 |
| Break through time (h:mm) | >3:30 | >1:30 | 0:34 |
| Pore volumes to break through | >3.4 | >3 | 0.53 |

Figure 4D:
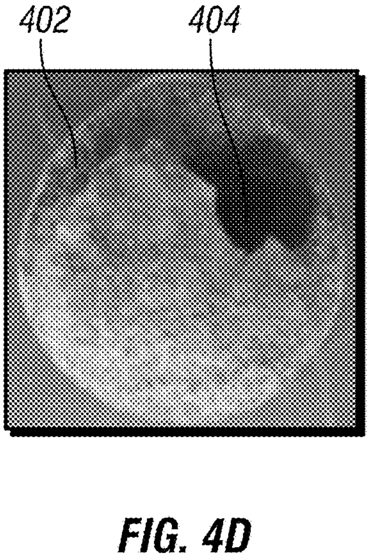
Figure 4E:
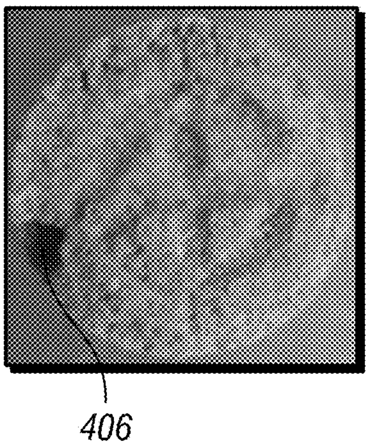

In the tests performed at 200° F., the core faces treated with 15% HCl (FIG. 4A) and 15% HCl with urea (FIG. 4B), both showed a large amount of core facial dissolution 402 and developing conical wormholes 404. In both cases, however, the confining pressure punctured the sleeve holding the core because too much of the rock face dissolved. For the 15% HCl with $MgCl_2$ fluid (FIG. 4C), the entry wormhole was much smaller and the wormholes 406 broke through to the opposite face in a timely fashion, 34 minutes with 0.53 pore volumes to break through. These indicate that at lower injection rates, retarded acid with $MgCl_2$ was effective. Table 3 provides the results of the same experiment conducted at 250° F., with similar comparative results both in data and facial dissolution as shown in FIG. 4D (for HCl alone) and FIG. 4E (for HCl with $MgCl_2$). A large amount of core facial dissolution 402 and a developing conical wormholes 404 occurred with HCl alone, while little facial dissolution and a narrower wormhole 406 resulted with the HCl and $MgCl_2$ mixture.

TABLE 3

| Core break through characteristics at low acid injection rates at 250° F. | | |
|---|---|---|
| Fluid => | 15% HCl | 15% HCl + 19% $MgCl_2$ |
| Injection rate (ml/min) | 0.4 | 0.4 |
| Break through time (h:mm) | >2:05 | 0:13 |
| Pore volumes to break through | >4 | 0.34 |

Figure 5:
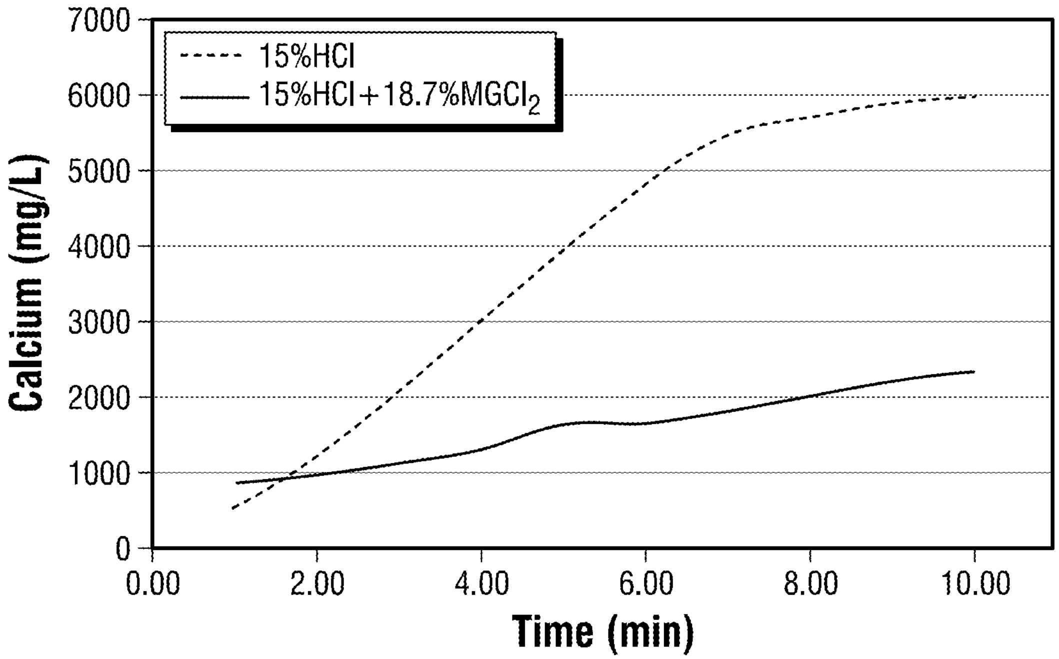

In another example, rotating disk experiments were performed to characterize the relative surface reaction rates of acidic solutions. The experiment was conducted by spinning a marble or limestone disk, at ambient temperature and 1250 rpm, in an acid formulation, and periodically sampling the solution. The samples were then analyzed for the calcium concentration as a function of time, which gives the rate constant of calcite ($CaCO_3$) dissolution by hydrochloric acid containing solutions. A decrease in rate constant indicates an acid retarding agent formulation whose surface reaction is retarded relative to hydrochloric acid alone, without any retarding agent. The plot in FIG. 5 illustrates slower dissolution rate, or slower rate of $Ca^{2+}$ ions liberation over time, for the 15% HCl solution containing $MgCl_2$ compared with unmodified 15% HCl within 10 minutes. The results in FIG. 5 are a comparison of 15% HCl alone to 15% HCl mixed with 18.7% $MgCl_2$ retarding agent.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as “first,” “second,” and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as “inner,” “outer,” “beneath,” “below,” “lower,” “above,” “upper,” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A treatment fluid, comprising:

an emulsion of an aqueous phase and an organic phase, the emulsion stabilized using a cationic surfactant;

wherein the aqueous phase comprises an acid and a water-soluble acid retarding agent;

wherein the acid is present in the treatment fluid in an amount up to 45.7 wt. % based on a total weight of the treatment fluid and includes hydrogen chloride (HCl);

wherein the water-soluble acid retarding agent comprises 19 wt. % of magnesium chloride ($MgCl_2$) based on the total weight of the treatment fluid; and wherein an acid retardation factor of the treatment fluid is between 3 to 11 at 70° C.

2. The treatment fluid of claim 1, wherein the aqueous phase of the emulsion is about 70% by volume, and the organic phase of the emulsion is about 30% by volume.

3. The treatment fluid of claim 1, wherein the emulsion is stabilized using the cationic surfactant, and the cationic surfactant comprises the structure [RNXYZ}+A−;

wherein R is an alkyl chain of 10 to 18 carbons; X, Y, and Z are each selected from the group consisting of methyl, ethyl, hydroxyethyl, and benzyl; and A is an anion selected from the group consisting of fluoride, chloride, bromide, iodide, acetate, sulfate, alkylsulfonate, and arylsulfonate.

4. The treatment fluid of claim 1, wherein the organic phase comprises alkanes, cycloalkanes, aromatic compounds, heteroaromatic compounds, or combinations thereof.

5. The treatment fluid of claim 1, wherein a water concentration of the emulsion is less than or equal to 80 wt.% based on a total weight of the emulsion.

6. The treatment fluid of claim 1, wherein the treatment fluid is an oilfield treatment fluid.

7. The treatment fluid of claim 6, wherein the oilfield treatment fluid comprises a matrix acidizing fluid, a wellbore cleanup fluid, a pickling fluid, a near wellbore damage cleanup fluid, a surfactant treatment fluid, or an unviscosified fracture fluid.

8. A method comprising:

providing a treatment fluid, comprising:

an emulsion of an aqueous phase and an organic phase, the emulsion stabilized using a cationic surfactant;

wherein the aqueous phase comprises an acid and a water-soluble acid retarding agent;

wherein the acid is present in the treatment fluid in a non-zero amount up to 45.7 wt.% based on a total weight of the treatment fluid and includes hydrogen chloride (HCl);

wherein the water-soluble acid retarding agent comprises 19 wt.% of magnesium chloride ($MgCl_2$) based on the total weight of the treatment fluid; and wherein an acid retardation factor of the treatment fluid is between 3 to 11 at 70° C.; and treating a subterranean formation fluidly coupled to a wellbore with the treatment fluid.

9. The method of claim 8, wherein the emulsion is stabilized using the cationic surfactant, and the cationic surfactant comprises the structure [RNXYZ}+A−;

wherein R is an alkyl chain of 10 to 18 carbons; X, Y, and Z are each selected from the group consisting of methyl, ethyl, hydroxyethyl, and benzyl; and A is an anion selected from the group consisting of fluoride, chloride, bromide, iodide, acetate, sulfate, alkylsulfonate, and arylsulfonate.

10. The method of claim 8, wherein the aqueous phase of the emulsion is about 70% by volume, and the organic phase of the emulsion is about 30% by volume.

11. The method of claim 8, wherein the organic phase comprises alkanes, cycloalkanes, aromatic compounds, heteroaromatic compounds, or combinations thereof.

* * * * *